US012651942B2

(12) United States Patent (10) Patent No.: US 12,651,942 B2

Mogro Zambrano et al. (45) Date of Patent: Jun. 9, 2026

(54) ELECTRIC DRIVE UNIT INCLUDING A HEAT EXCHANGER WITH PHASE CHANGING MATERIAL

(71) Applicant: Schaeffler Technologies AG & Co. KG, Herzogenaurach (DE)

(72) Inventors: Antonio Eduardo Mogro Zambrano, Puebla (MX); Diego Alberto Abreu, CDMX (MX); Andrea Lopez, Huejotzingo (MX)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 230 days.

(21) Appl. No.: 18/654,568

(22) Filed: May 3, 2024

(65) Prior Publication Data

US 2025/0343468 A1 Nov. 6, 2025

(51) Int. Cl.
*H02K 9/19* (2006.01)
*H02K 5/20* (2006.01)
*H02K 15/14* (2006.01)

(52) U.S. Cl.
CPC .............. *H02K 9/19* (2013.01); *H02K 5/203* (2021.01); *H02K 15/14* (2013.01)

(58) Field of Classification Search
CPC ........... H02K 9/19; H02K 5/203; H02K 15/14
See application file for complete search history.

(56) References Cited

U.S. PATENT DOCUMENTS

2023/0093220 A1* 3/2023 Vanhee ................ H02K 1/2766
310/54

* cited by examiner

*Primary Examiner* — Sean Gugger
(74) *Attorney, Agent, or Firm* — Davidson Kappel LLC

(57) ABSTRACT

An electric drive unit includes an electric motor, and a housing enclosing the electric motor. The housing includes a first wall including an inner surface and an outer surface. The outer surface is opposite of the inner surface. The electric drive unit further includes a heat exchanger attached to the housing. The heat exchanger includes an inner cover configured for defining a first fluid flow channel between the inner cover and the outer surface of the first wall and an outer cover attachable to the inner cover. The inner cover is configured to transfer heat between the first fluid flow channel and the outer cover. The heat exchanger further includes a phase changing material radially between the inner cover and the outer cover. The phase changing material is configured for latent heat transfer with the inner cover to maintain a temperature of fluid in the first fluid flow channel in a predetermined range.

19 Claims, 6 Drawing Sheets

ELECTRIC DRIVE UNIT INCLUDING A HEAT EXCHANGER WITH PHASE CHANGING MATERIAL

The present disclosure relates generally to heat exchangers for electric motors, and more specifically to heat exchangers for electric motors in motor vehicle drivetrains.

BACKGROUND

U.S. Pub. 2023/0387755A1 discloses an electric drive unit including a heat exchanger attached to the housing.

SUMMARY

An electric drive unit is provided that includes an electric motor, and a housing enclosing the electric motor. The housing includes a first wall including an inner surface and an outer surface. The outer surface is opposite of the inner surface. The electric drive unit further includes a heat exchanger attached to the housing. The heat exchanger includes an inner cover configured for defining a first fluid flow channel between the inner cover and the outer surface of the first wall and an outer cover attachable to the inner cover. The inner cover is configured to transfer heat between the first fluid flow channel and the outer cover. The heat exchanger further includes a phase changing material radially between the inner cover and the outer cover. The phase changing material is configured for latent heat transfer with the inner cover to maintain a temperature of fluid in the first fluid flow channel in a predetermined range.

In examples, the phase changing material is configured to absorb heat from the inner cover to maintain a temperature of a first fluid in the first fluid flow channel in the predetermined range.

In examples, the predetermined range is between 80° C. and 90° C.

In examples, the predetermined range is between 82° C. and 86° C.

In examples, a phase change temperature of the phase changing material is about 83 to 85° C.

In examples, the phase changing material is configured to release heat to the inner cover to maintain the fluid in the first fluid flow channel in the predetermined range.

In examples, the predetermined range is between 0° C. and 10° C.

In examples, the predetermined range is between 2° C. and 6° C.

In examples, a phase change temperature of the phase changing material is about 3 to 5° C.

In examples, the inner cover contacts the outer cover to conduct heat between the inner cover to the outer cover.

In examples, the housing includes a second wall extending radially from the first wall and a third wall extending radially from the first wall, the inner cover and the outer cover being fixed to the housing at the second wall and the third wall.

In examples, the inner cover includes: a first end section fixed to the second wall; a second end section fixed to the third wall; a first intermediate section extending radially inward from first end section toward the first wall, the first intermediate section including a radially outer portion connected to the first section and a radially inner portion; and a second intermediate section extending circumferentially from the radially inner portion to the second end section.

In examples, the first intermediate section, the second intermediate section and the outer cover define a chamber receiving the phase changing material.

In examples, the second intermediate section includes fins extending into the chamber.

In examples, the housing is configured for directing circumferential fluid flow through the fluid flow channel along the second intermediate section.

In examples, the electric motor includes a stator, a rotor rotatable within the stator and a stator carrier connected to an outer circumference of the stator, the first wall being radially outside of the stator carrier and defining a second fluid flow channel with the stator carrier for a second fluid to flow through.

In examples, the outer cover is arranged for being exposed to ambient air for convective heat transfer with the ambient air.

In examples, the phase changing material is configured to change from solid to liquid to remove heat from the first fluid or to change from liquid to solid to supply heat to the first fluid.

A method of forming an electric drive unit is also provided includes installing an electric motor inside a housing; and attaching a heat exchanger onto the housing to define a first fluid flow channel between the heat exchanger and a first wall of the housing. The heat exchanger includes an inner cover configured for defining the first fluid flow channel for a first fluid to flow between the inner cover and outer surface of the wall; an outer cover attachable to the inner cover, the inner cover being configured to transfer heat between the first fluid flow channel and the outer cover; and a phase changing material radially between the inner cover and the outer cover. The phase changing material is configured for latent heat transfer with the inner cover to maintain a temperature of fluid in the first fluid flow change in a predetermined range.

BRIEF DESCRIPTION OF THE DRAWINGS

The present disclosure is described below by reference to the following drawings, in which.

DETAILED DESCRIPTION

Figure 1:
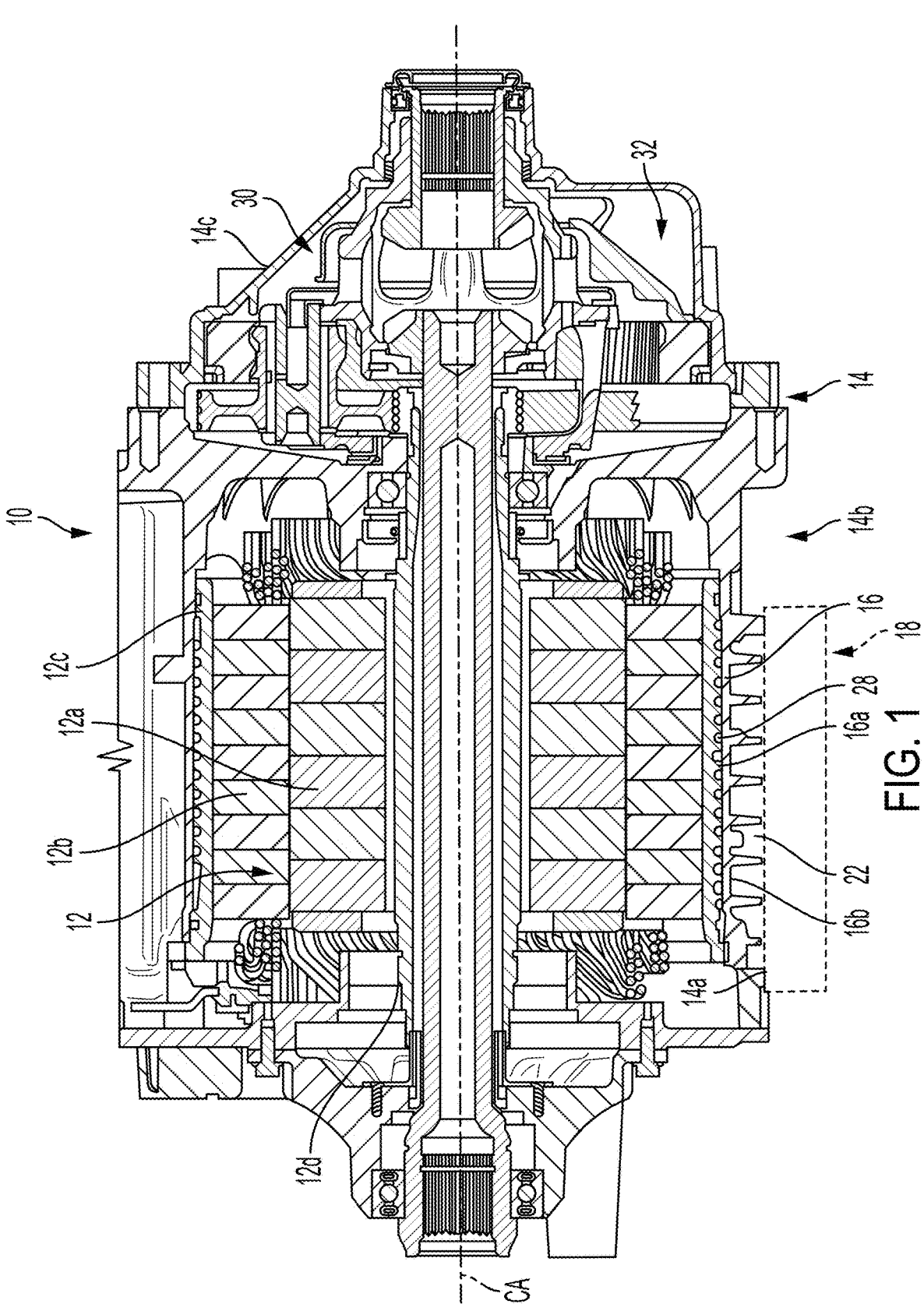
FIG. 1 shows a radial cross-sectional view of an electric drive unit according to the present disclosure.
Figure 2:
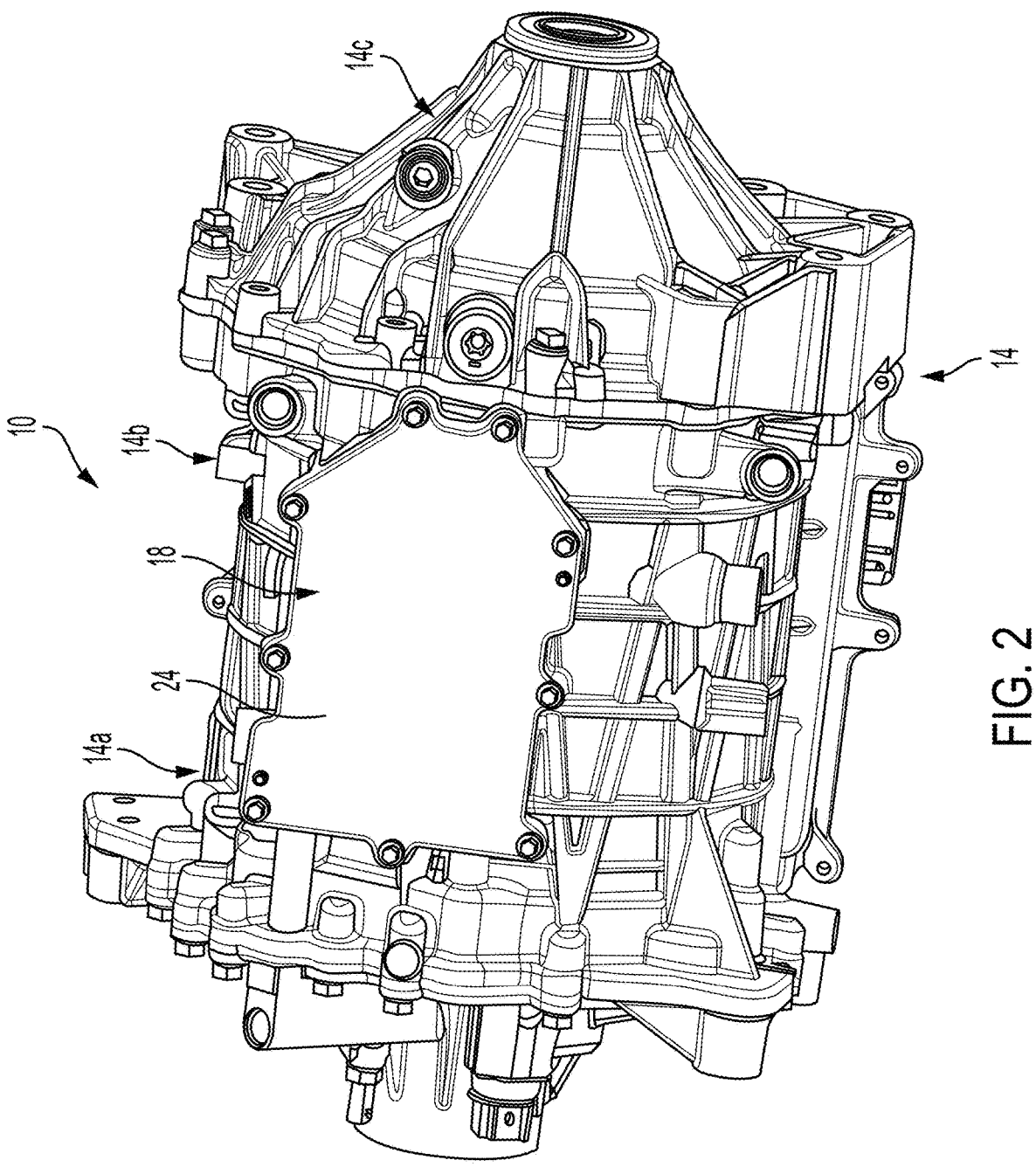
FIG. 2 shows a perspective view of the electric drive unit shown in FIG. 1.

Rotors of asynchronous induction motors in electric drive units are actively cooled to maintain operational integrity. This can include cooling oil circulating throughout the electric drive unit by circulating cooling water through the electric drive unit to absorb heat from the oil. The present disclosure uses a phase changing material in addition to cooling water.

The oil flow rate that goes through the rotor can operate with or without an oil pump. If the oil flow rate is produced without an oil pump, the system pressure is generated by using the hydrostatic pressure of the oil circuit and the dynamic pressure from the oil splashing from the gearbox. This oil flow passes through a heat exchanger and entering a rotating hollow shaft, then finally comes back to the gearbox. The oil is cooled down by the heat exchanger which releases the heat to the wall of the housing that defines a fluid flow channel for the water.

An oil pump can be omitted, and thus if the pressure drop of the oil circuit (heat exchanger included) is higher than the hydrostatic and dynamic pressure of the inlet of the oil circuit, oil flow is halted and the rotor can overheat. Using a heat exchanger including a phase changing material can prevent such overheating.

FIGS. 1 to 6 show an electric drive unit 10 including an electric motor 12, a housing 14 enclosing the electric motor 12, and a heat exchanger 18 attached to an outer circumferential surface 14a of the housing 14. The housing 14 includes a first wall 16 including an inner surface 16a and an outer surface 16b opposite of the inner surface 16a. As illustrated in FIGS. 3 to 6, the heat exchanger 18 includes an inner cover 20 configured for defining a first fluid flow channel 22 between the inner cover 20 and the outer surface 16b of the first wall 16 and an outer cover 24 attachable to the inner cover 20. The inner cover 20 is configured to transfer heat between the first fluid flow channel 22 and the outer cover 24. The heat exchanger 18 further includes a phase changing material 26 radially between the inner cover 20 and the outer cover 24. The phase changing material 26 is configured for latent heat transfer with the inner cover 20 to maintain a temperature of fluid in the first fluid flow channel 22 in a predetermined range.

In some examples, the phase changing material 26 can ensure the cooling function of the oil flowing through first fluid flow channel 22 by avoiding high temperatures (e.g., higher than 90° C.) where oil does not reach the desired thermal performance. The phase changing material 26 can thus be endothermic and is configured to absorb heat from the inner cover 20 to maintain a temperature of the first fluid in the first fluid flow channel in the predetermined range. The predetermined range can be defined within a wide range of temperatures by using different phase changing materials. For this example, its range can advantageously be between 80° C. and 90° C. The predetermined range can more specifically be between 82° C. and 86° C., and a phase change temperature of the phase changing material 26 can be about 82 to 86° C. The phase changing material is configured to change from solid to liquid to remove heat from the first fluid in first fluid flow channel 22. The endothermic phase changing material 26 can for example be a paraffin wax, including Paraffin Natural wax 811.

In other examples, the phase changing material 26 can ensure lubrication of the oil flowing through first fluid flow channel 22 by avoiding low temperatures (e.g., lower than 0° C.) where oil high viscosity reduces the flow rate within the electric drive unit 10, resulting in not enough for continuous lubrication. The phase changing material 26 can thus be exothermic configured to release heat to the inner cover 20 to maintain the fluid in the first fluid flow channel in the predetermined range. The predetermined range can advantageously be between 0° C. and 10° C. More specifically, the predetermined range can be between 2° C. and 6° C. and the phase change temperature of the phase changing material 26 can be about 2 to 6° C. The phase changing material is configured to change from liquid to solid to supply heat to the first fluid in first fluid flow channel 22. The exothermic phase changing material 26 can for example be a paraffin wax, including n-Tetradecane (C14).

As shown in FIG. 1, the electric motor 12 includes a rotor 12a and a stator 12b, with rotor 12a being rotatable within stator 12b. A stator carrier 12c is attached to the outer circumference of the stator 12b, and rotor 12a is non-rotatably fixed to a rotor shaft 12d for rotation about a center axis CA. Unless otherwise specified, the terms radial, axial, circumferential and derivatives thereof are used in reference to the center axis CA. The electric drive unit 10 is configured for use as an electric axle and can drive two axles about center axis CA.

The housing 14 encloses the electric motor 12, a gearbox 30 and a sump 32. More specifically, housing 14 includes a first section 14b surrounding electric motor 12, and a second section 14c surrounding gearbox 30 and sump 32. The first wall 16 surrounds the stator carrier 12c and a second fluid flow channel 28 is formed between inner surface 16a of first wall 16 and the outer circumferential surface of stator carrier 12c. The gearbox 30 is mechanically coupled to the rotor shaft 12d, and the sump 32 is configured to collect and store fluid within the electric drive unit 10.

The heat exchanger 18 facilitates the transfer of heat away from or toward the electric motor 12 to maintain optimal operating temperatures via convection, conduction and latent heat transfer. More specifically, the inner cover 20 can conduct heat from first fluid flow channel 22 to outer cover 24, which engages in convective heat transfer with the ambient air to which outer cover 24 is exposed. Phase changing material 26 engages in latent heat transfer by undergoing phase changes to absorb and release thermal energy, thereby regulating the temperature of the fluid in first fluid flow channel 22. The second fluid flowing in second fluid flow channel 28 can also engage in conductive heat transfer with the first fluid flowing in first fluid flow channel 22. The first fluid can be oil and the second fluid can be water.

Figure 3:
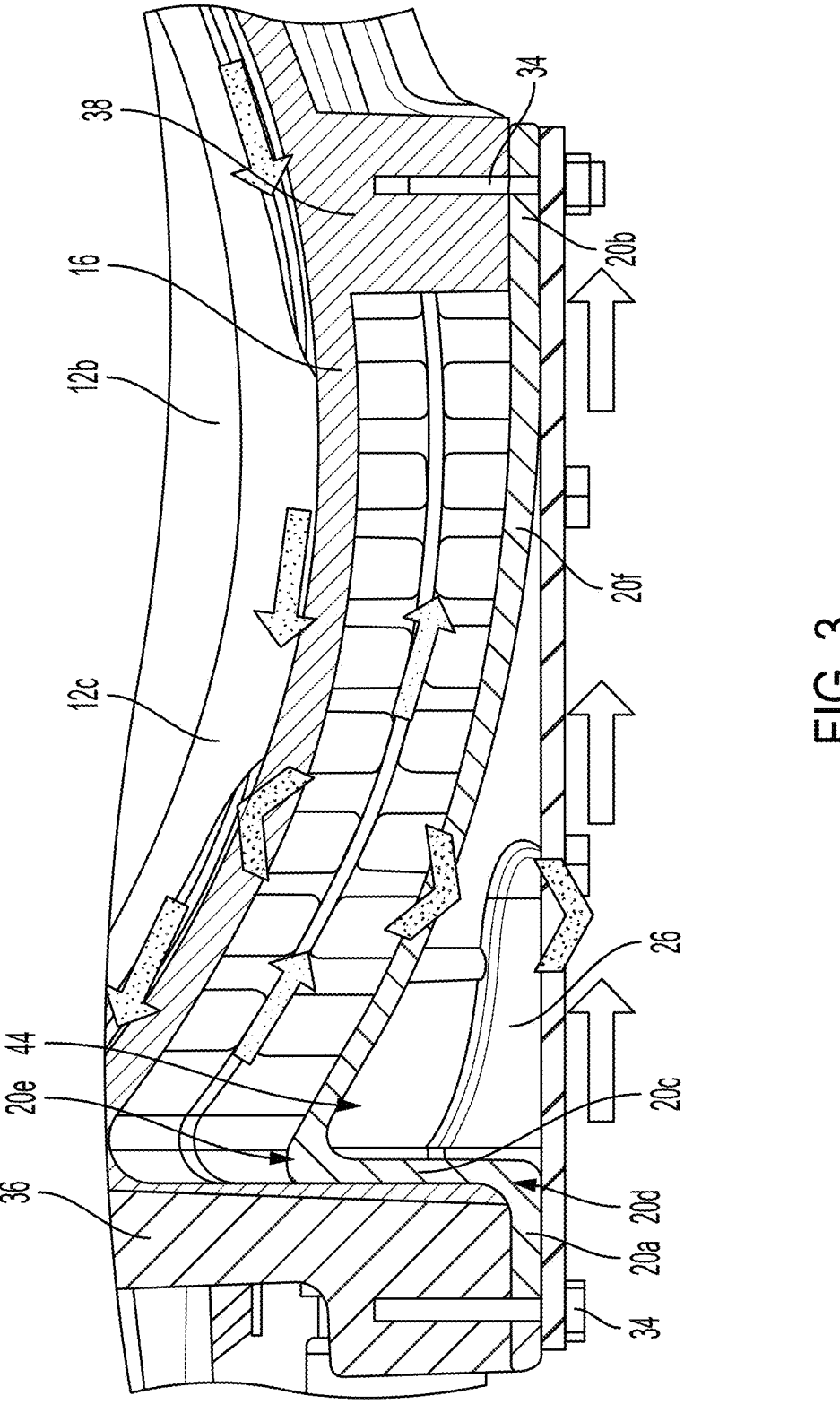
FIG. 3 shows an axial facing cross-sectional view of a heat exchanger of the electric drive units shown in FIGS. 1 and 2.

As illustrated in FIG. 3, the inner cover 20 contacts the outer cover 24 to conduct heat between the inner cover 20 to the outer cover 24. The inner cover 20 and outer cover 24 are removably connected to housing 14 via fasteners 34 passing through holes 20i in inner cover 20 and holes 24a in outer cover 24. The removable connection can provide modularity, allowing outer cover 24 and phase changing material 26 to be omitted when the benefit provided by phase changing material 26 is unnecessary.

Figure 4:
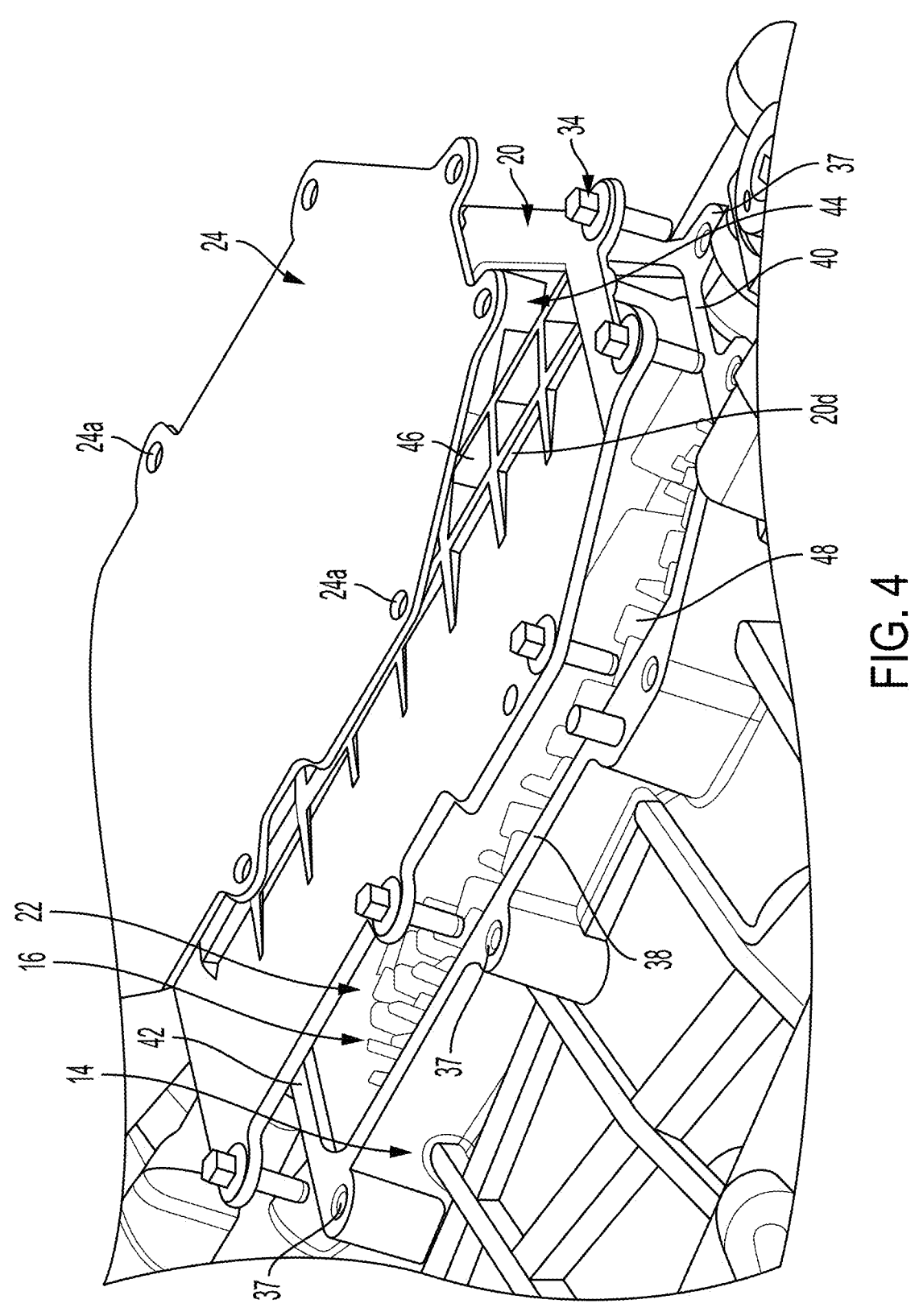
FIG. 4 shows a perspective exploded view of the heat exchanger shown in FIG. 3.

As illustrated in FIGS. 3 and 4, the housing includes a second wall 36, a third wall 38, a fourth wall 40 and a fifth wall 42 that together define the axial and circumferential boundaries of first fluid flow channel 22. More specifically walls 36, 38 define the circumferential boundaries of first fluid flow channel 22 and walls 40, 42 define the axial boundaries of first fluid flow channel 22. The walls 36, 38, 40, 42 all extends radially outward from the first wall 16, and the inner cover 20 and the outer cover 24 are fixed to the housing 24 at the walls 36, 38, 40, 42. As shown in FIG. 4, walls 36, 38, 40, 42 are provided with threaded bores 37 for receiving fasteners 34.

Continuing to refer to FIG. 3, the inner cover 20 includes a first circumferential end section 20a fixed to the second wall 36 and a second circumferential end section 20b fixed to the third wall 38. The inner cover 20 further includes a first intermediate section 20c extending radially inward from first circumferential end section 20a toward the first wall 16. The first intermediate section 20c includes a radially outer portion 20d connected to the first circumferential end section 20a and a radially inner portion 20e that is closer to first wall 16 than radially outer portion 20d. The inner cover 20 also includes a second intermediate section 20f extending circumferentially from the radially inner portion 20e to the second circumferential end section 20b.

Figure 5:
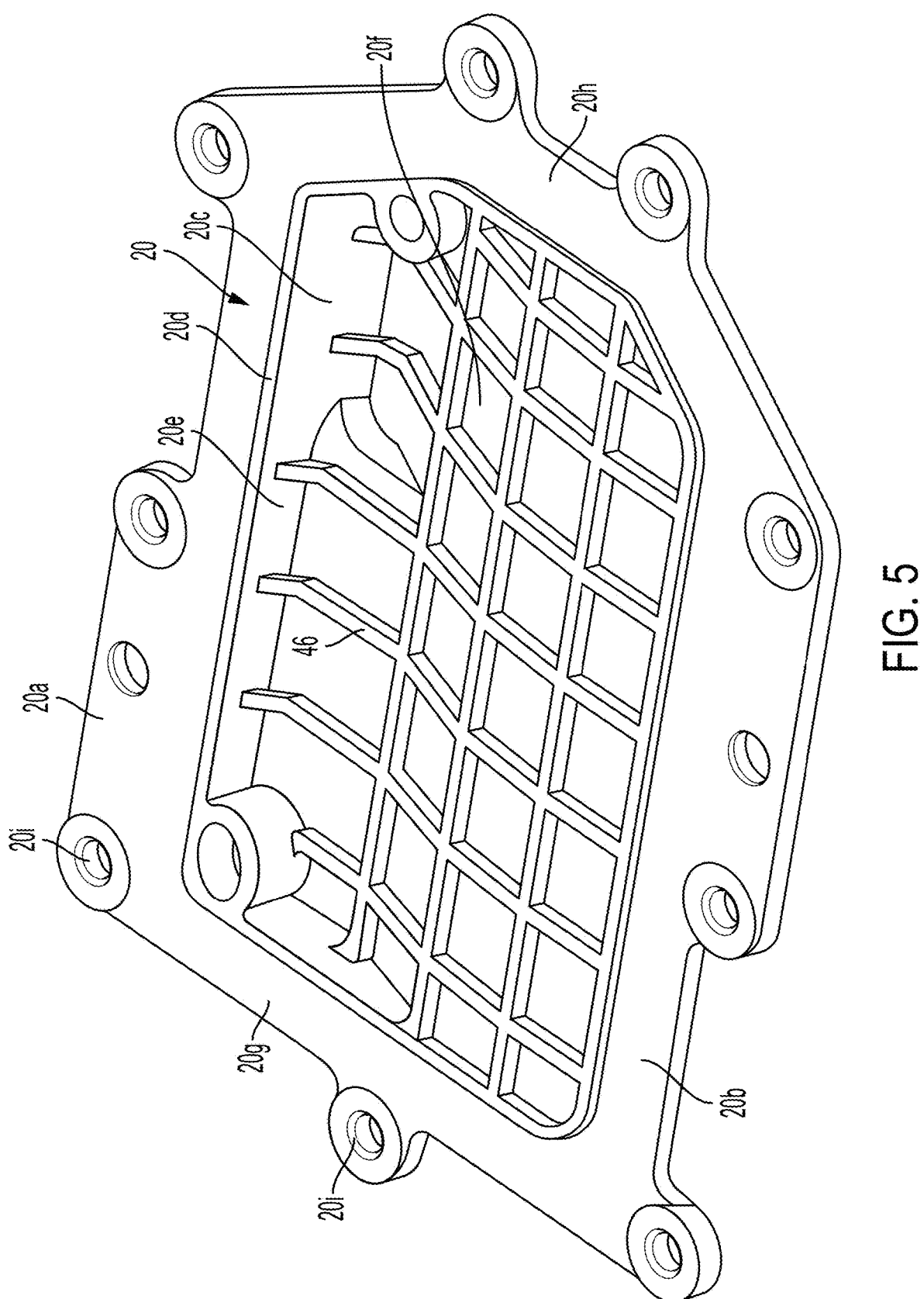
FIG. 5 shows a perspective view of an outer surface of an inner plate of the heat exchanger shown in FIGS. 3 and 4.
Figure 6:
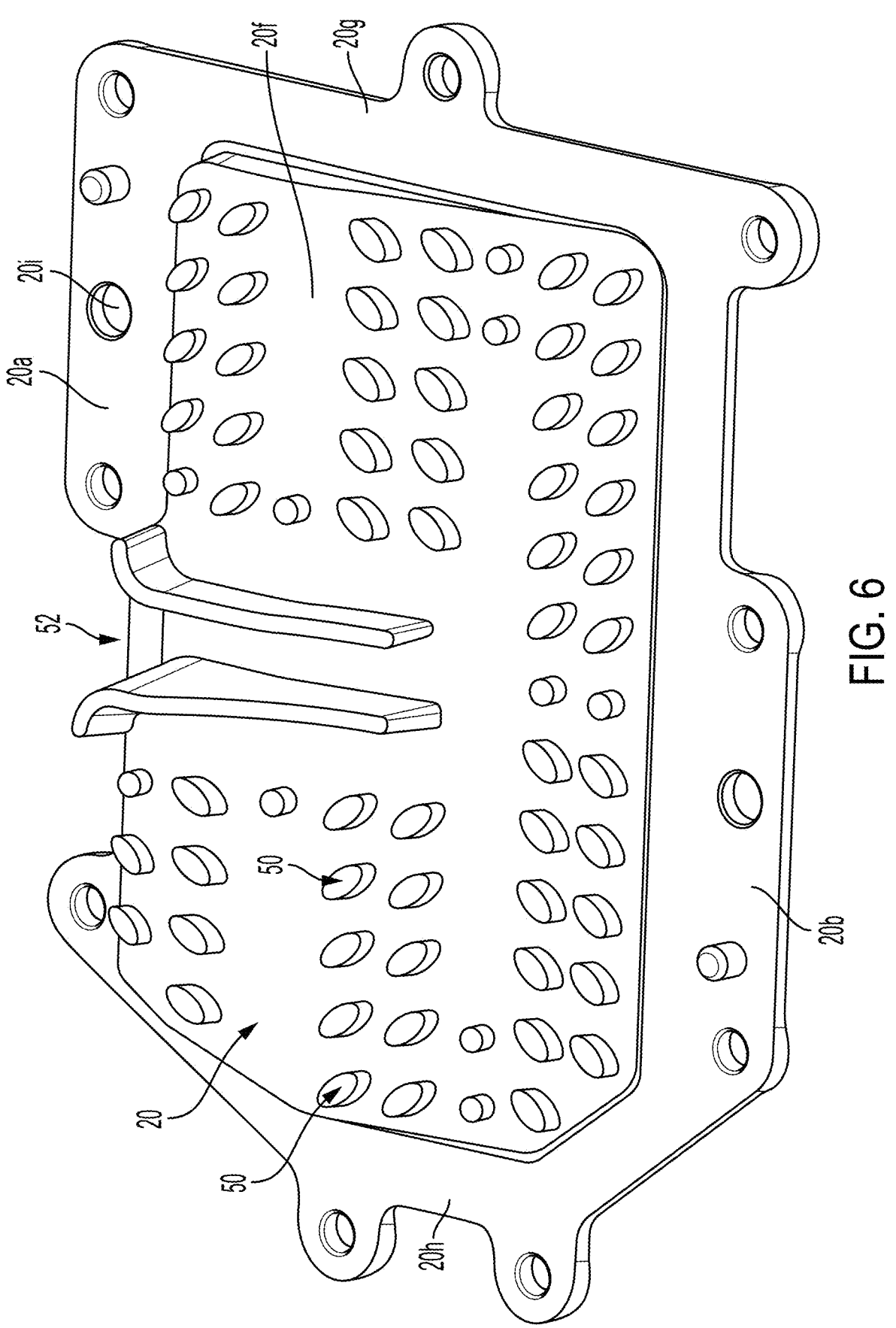
FIG. 6 shows a perspective view of an inner surface of the inner plate shown in FIG. 5.

The first intermediate section 20c, the second intermediate section 20f and the outer cover 24 define a chamber 44 receiving the phase changing material 26. The chamber 44 has a tapered shape that narrows while extending circumferentially from first intermediate section 20c to second circumferential end section 20b. As illustrated in FIGS. 4 and 5, the second intermediate section 20f includes fins 46 extending radially outward into the chamber 40. The fins 46 intersect each other to define a lattice shape.

The housing 14 is configured for directing circumferential flow of the first fluid through the fluid flow channel 22 along the second intermediate section 20f. Both the wall 16 and the inner cover 20 include respective protrusion 48, 50 that extend into first fluid flow channel 22 to increase the heat transfer out of or into first fluid flow channel 22. Protrusions 48 of first wall 16 are provided on outer surface 16b and extend toward inner cover 20. Protrusions 50 of inner cover 20 are provided on an inner surface of inner cover 20 and extend toward first wall 16.

A method of forming the electric drive unit 10 can include installing electric motor 12 inside the housing 14, and attaching 18 heat exchanger including phase changing material 26 onto the housing 14 to define the first fluid flow channel 22 between the heat exchanger 18 and the first wall 16 of the housing 14.

In the preceding specification, the present disclosure has been described with reference to specific exemplary embodiments and examples thereof. It will, however, be evident that various modifications and changes may be made thereto without departing from the broader spirit and scope of present disclosure as set forth in the claims that follow. The specification and drawings are accordingly to be regarded in an illustrative manner rather than a restrictive sense.

LIST OF REFERENCE NUMERALS 10 electric drive unit
12 electric motor
12a rotor
12b stator
12c stator carrier
12d rotor shaft
14 housing
14a outer circumferential surface
14b first section
14c second section
16 first wall
16a inner surface
16b outer surface
18 heat exchanger
20 inner cover
20a first circumferential end section
20b second circumferential end section
20c first intermediate section
20d radially outer portion
20e radially inner portion
20f second intermediate section
20i holes
22 first fluid flow channel
24 outer cover
24a holes
26 phase changing material
28 second fluid flow channel 30 gearbox
32 sump
34 fasteners
36 walls
37 threaded bores
38 walls
40 walls
42 walls
44 chamber
46 fins
48 respective protrusion
50 respective protrusion

What is claimed is:

1. An electric drive unit, comprising:
an electric motor;
a housing enclosing the electric motor, the housing including a first wall including an inner surface and an outer surface, the outer surface being opposite of the inner surface;
a heat exchanger attached to the housing, the heat exchanger including:
an inner cover configured for defining a first fluid flow channel between the inner cover and the outer surface of the first wall;
an outer cover attachable to the inner cover, the inner cover being configured to transfer heat between the first fluid flow channel and the outer cover;
a phase changing material radially between the inner cover and the outer cover, the phase changing material configured for latent heat transfer with the inner cover to maintain a temperature of fluid in the first fluid flow channel in a predetermined range.

2. The electric drive unit recited in claim 1, wherein the phase changing material is configured to absorb heat from the inner cover to maintain a temperature of a first fluid in the first fluid flow channel in the predetermined range.

3. The electric drive unit recited in claim 2, wherein the predetermined range is between 80° C. and 90° C.

4. The electric drive unit recited in claim 3, wherein the predetermined range is between 82° C. and 86° C.

5. The electric drive unit recited in claim 4, wherein a phase change temperature of the phase changing material is about 83 to 85° C.

6. The electric drive unit recited in claim 1, wherein the phase changing material is configured to release heat to the inner cover to maintain the fluid in the first fluid flow channel in the predetermined range.

7. The electric drive unit recited in claim 6, wherein the predetermined range is between 0° C. and 10° C.

8. The electric drive unit recited in claim 7, wherein the predetermined range is between 2° C. and 6° C.

9. The electric drive unit recited in claim 8, wherein a phase change temperature of the phase changing material is about 3 to 5° C.

10. The electric drive unit recited in claim 1, wherein the inner cover contacts the outer cover to conduct heat between the inner cover to the outer cover.

11. The electric drive unit recited in claim 10, wherein the housing includes a second wall extending radially from the first wall and a third wall extending radially from the first wall, the inner cover and the outer cover being fixed to the housing at the second wall and the third wall.

12. The electric drive unit recited in claim 11, wherein the inner cover includes:
a first end section fixed to the second wall;
a second end section fixed to the third wall;

a first intermediate section extending radially inward from first end section toward the first wall, the first intermediate section including a radially outer portion connected to the first section and a radially inner portion; and a second intermediate section extending circumferentially from the radially inner portion to the second end section.

13. The electric drive unit recited in claim 12, wherein the first intermediate section, the second intermediate section and the outer cover define a chamber receiving the phase changing material.

14. The electric drive unit recited in claim 13, wherein the second intermediate section includes fins extending into the chamber.

15. The electric drive unit recited in claim 12, wherein the housing is configured for directing circumferential fluid flow through the fluid flow channel along the second intermediate section.

16. The electric drive unit recited in claim 1, wherein the electric motor includes a stator, a rotor rotatable within the stator and a stator carrier connected to an outer circumference of the stator, the first wall being radially outside of the stator carrier and defining a second fluid flow channel with the stator carrier for a second fluid to flow through.

17. The electric drive unit recited in claim 1, wherein the outer cover is arranged for being exposed to ambient air for convective heat transfer with the ambient air.

18. The electric drive unit recited in claim 1, wherein the phase changing material is configured to change from solid to liquid to remove heat from the first fluid or to change from liquid to solid to supply heat to the first fluid.

19. A method of forming an electric drive unit comprising:

installing an electric motor inside a housing; and attaching a heat exchanger onto the housing to define a first fluid flow channel between the heat exchanger and a first wall of the housing, the heat exchanger including:

an inner cover configured for defining the first fluid flow channel for a first fluid to flow between the inner cover and outer surface of the wall;

an outer cover attachable to the inner cover, the inner cover being configured to transfer heat between the first fluid flow channel and the outer cover; and a phase changing material radially between the inner cover and the outer cover, the phase changing material configured for latent heat transfer with the inner cover to maintain a temperature of fluid in the first fluid flow change in a predetermined range.

* * * * *